United States Patent

Masuda

[11] Patent Number: 5,883,452
[45] Date of Patent: Mar. 16, 1999

[54] CREDIT CARD SYSTEM AND METHOD OF ISSUING CREDIT CARD USING SUCH A SYSTEM

[75] Inventor: Hidehiro Masuda, Tokyo, Japan

[73] Assignee: Nippon Shinpan Co., Ltd., Tokyo, Japan

[21] Appl. No.: 493,285

[22] Filed: Jun. 21, 1995

[30] Foreign Application Priority Data

Jun. 30, 1994 [JP] Japan .................................. 6-170452

[51] Int. Cl.$^6$ .......................... G06F 17/60; G06F 17/00
[52] U.S. Cl. ........................................ 235/380; 235/379
[58] Field of Search ................................. 235/380, 379, 235/375; 340/225.31; 364/401; 382/2

[56] References Cited

U.S. PATENT DOCUMENTS

| | | | |
|---|---|---|---|
| 4,650,975 | 3/1987 | Kitchener | 235/375 |
| 4,684,791 | 8/1987 | Bito | 235/380 |
| 4,734,569 | 3/1988 | Kawana et al. | 235/487 |
| 4,772,782 | 9/1988 | Nonat | 235/380 |
| 4,810,862 | 3/1989 | Nakano et al. | 235/380 |
| 4,839,506 | 6/1989 | Homma et al. | 235/379 |
| 4,968,873 | 11/1990 | Dethloff et al. | 235/380 |
| 5,012,074 | 4/1991 | Masada | 235/379 |
| 5,350,906 | 9/1994 | Brody et al. | 235/379 |
| 5,365,046 | 11/1994 | Haymann | 235/380 |

FOREIGN PATENT DOCUMENTS

| | | |
|---|---|---|
| 61-139498 | 6/1986 | Japan . |
| 61-93278 | 6/1986 | Japan . |
| 61-150172 | 9/1986 | Japan . |
| 63-131306 | 6/1988 | Japan . |
| 4-43095 | 2/1992 | Japan . |
| 0142477 | 8/1993 | Japan .................. G06F 15/30 |

*Primary Examiner*—Donald T. Hajec
*Assistant Examiner*—Thien Minh Le
*Attorney, Agent, or Firm*—Fish & Richardson P.C.

[57] ABSTRACT

A credit card system has a card with first identification information written thereon, a reading/writing unit for writing information on and reading information from the card, an input device for entering second identification information, a processor for deriving second identification information from information written on the card, comparing the second identification information entered by the entering device with the second identification information derived by the deriving device, and controlling the reading/writing unit to write information representing allowance of issuance of the card on the card if the compared second identification information agrees with each other.

12 Claims, 8 Drawing Sheets

FIG. 3

| CUSTOMER INFORMATION FILE | | | | | |
|---|---|---|---|---|---|
| ID INFORMATION | ID 1 | ID 2 | PASSWORD | NAME | AGE |
| | ADDRESS | TEL. | OFFICE | SEX | DATE OF BIRTH |
| | EFFECTIVE UNTIL | | | | |
| CREDIT INFORMATION | CREDIT-GRANTING AMOUNT | | LIMIT AMOUNT FOR CREDITS | | |
| | CREDIT BALANCE | UNCOLLECTED AMOUNT | AMOUNT CREDITED THIS MONTH | | |
| ACCIDENT INFORMATION | | | | | |

CREDIT CARD SYSTEM AND METHOD OF ISSUING CREDIT CARD USING SUCH A SYSTEM

BACKGROUND OF THE INVENTION

1. Field of the Invention

The present invention relates to a system for issuing credit cards to customers for use in selling goods and services (hereinafter collectively referred to as "goods"), and more particularly to a system for checking the validity of credit cards when they are issued and used so as to prevent credit cards from being issued and used illegally.

2. Description of the Related Art

At present, it is very popular for customers to pay for goods with credit. Generally, there are two types of payment available, i.e., payment by single-purchase sales credit and payment with a credit card. According to the former payment method, each time a person buys goods at a retail store, he fills out an application form to apply for payment by sales credit with a credit company or credit control division of the same company (hereinafter referred to as a "credit company") through the retail store. After the credit company checks the credibility of the purchaser, the credit company gives the retail store a membership number indicating that the application has been accepted. The retail store then accepts the payment by sales credit. This payment method requires that each application for payment by single-purchase sales credit be accepted by the credit company. Therefore, the credit company controls every sales contract based on payment by sales credit, is free of multiple debts and credit collection failures in credit sales, and can entrust retail stores with the preparation of filled-out applications. Purchasers can acquire the goods almost at the same time they apply for payment by sales credit, and carry back the goods from the retail store. Consequently, this payment method requires no preparatory period in advance and is immediately available for customers and retail stores, and effective to promote sales.

According to the payment method using a credit card, the user needs to obtain a credit card before he buys goods with the credit card. Specifically, the user sends an filled-out application form to a credit company either directly or via a retail store, and the credit company then checks the application. Since no such information is available at the time the credit company issues a credit card as about goods which the user is going to buy and the amount of money which the user is going to pay, the credit company usually sets a credit limit for the user, and issues a credit card with a notice of the credit limit to the user. After having received the credit card, the user can purchase goods with the credit card simply by signing a slip insofar as the amount of money which the user is going to pay for the purchased goods is less than the credit limit.

Although the former payment method provides credit on the spot, as described above, it requires a complex process which the user and the retail store have to follow because the user has to apply for payment by sales credit each time he buys goods with credits. For example, when a person buys different goods on different floors of a department store, he has to apply for payment by single-purchase sales credit each time he buys goods on each floor.

The latter payment method requires the credit company to carry out an investigation procedure including detailed credibility check because the credit limit cannot fully be checked each time the user purchases goods with the credit card. It takes a relatively long period of time before a requested credit card is issued to a customer because of the time and efforts needed to prepare and mail the credit card to the customer. To solve this problem, attempts have been made to issue a credit card immediately on site. However, such an approach also has problems because a certain number of unissued credit cards need to be in stock at the credit card issuing desk, and a person from the credit company, rather than the retail store, is required to directly handle the issuance of credit cards in order to avoid the risk of illegal issuance of credit cards and illegal use of missing credit cards.

As described above, the former payment method is not suitable for repeated use because an application is required each time it is relied upon, but is advantageous in that safety in credit sales is high and retail stores can be entrusted with the preparation of filled-out applications. The latter payment method is suitable for repeated use as no application is required each time it is relied upon, but is disadvantageous in that credit cards cannot immediately be issued when requested by users. The attempted process of immediately issuing credit cards on site has not been widespread because retail stores could not be entrusted with the issuance of credit cards due to possible illegal issuance and use of credit cards.

SUMMARY OF THE INVENTION

It is therefore an object of the present invention to provide a credit card system capable of issuing credit cards immediately upon request at retail stores, preventing credit cards from being illegally issued and used, and making possible highly safe credit sales.

According to the present invention, there is a credit card system provided which is comprised of a card having a means for storing written first identification information, as well as other devices with a means for writing information on and reading information from the said card, a means for entering second identification information, a means for deriving second identification information from information written on the card, a means for comparing the second identification information entered by the entering means with the second identification information derived by the deriving means, and a means for writing information representing allowance of issuance of the card on the card if the compared second identification information agrees with each other.

The second identification information may be logically derived from the first identification information.

The second identification information may correspond to the first identification information.

The card may have a limit amount column for recording a limit amount of money up to which the user of the credit card can pay with the credit card, and the credit card system may be further comprised of a means for updating the limit amount of money recorded in the limit amount column with an amount of money available to the user, and a means for comparing the limit amount of money recorded in the limit amount column with an amount of money to be paid by the user, and indicating or displaying the result of comparison.

The card may have an issuance expiration date column for recording a date on which the issuance of the credit card expires, and the credit card system may be further comprised of a means for comparing the issuance expiration date with a date on which the credit card is actually issued, and indicating or displaying the result of comparison.

The card may have a use expiration date column for recording a date on which the use of the credit card expires, and the credit card system may be further comprised of a means for comparing the use expiration date with a date on which the credit card is actually used, and indicating or displaying the result of comparison.

The card may have a password column for recording a password, and the credit card system may be further comprised of a means for comparing the password and a password entered by the entering means.

According to the present invention, there is also a method provided of issuing a credit card with a first system for issuing and managing a credit card, a second system for managing credit information of a customer, and a card having a means for storing written first identification information, the first system having a means for generating second identification information from the first identification information, a means for reading information from and writing information on the card, a means for entering the second identification information, a means for comparing the second identification information generated by the generating means with the second identification information entered by the entering means, and a means for writing information representing allowance of issuance of the card on the card if the compared second identification information agrees with each other, the method comprised of the steps of sending the first identification information and an inquiry as to whether a credit card can be issued or not, from the first system to the second system, transmitting second identification information generated from the first identification information to the first system when the second system determines that the credit card can be issued, entering the transmitted second identification information from the entering means into the first system, generating, in the first system, second identification information from the first identification information, comparing, in the first system, the generated second identification information with the second identification information which is transmitted from the second system, and writing information indicating that the credit card can be issued on the credit card and issuing the credit card if the compared second identification information agrees with each other.

According to the present invention, there is another method provided of issuing a credit card with a first system for issuing and managing a credit card, a second system for managing credit information of a customer, and a card having a means for storing written first identification information and second identification information, the first system having a means for reading information from and writing information on the card, a means for entering second identification information, a means for comparing the second identificaion information written on the card and the second information entered by the entering means, and a means for writing information representing allowance of issuance of the card on the card if the compared second identification information agrees with each other, the second system having a means for matching the second identification information to its corresponding first identification information, the method comprised of the steps of sending the first identification information and an inquiry as to whether a credit card can be issued or not, from the first system to the second system, transmitting the second identification information corresponding to the first identification information which is found by the matching means to the first system when the second system determines that the credit card can be issued, entering the transmitted second identification information from the entering means into the first system, comparing, in the first system, the second identification information written on the card with the second identification information which is transmitted from the second system, and writing information indicating that the credit card can be issued on the credit card and issuing the credit card if the compared second identification information agrees with each other.

According to the present invention, there is further provided a method of issuing a credit card with a first system for issuing and managing a credit card, a second system for managing credit information of a customer, and a card having a means for storing written first identification information, the first system having a means for matching the second identification information to its correponding first identification information, a means for reading information from and writing information on the card, a means for entering the second identification information, a means for comparing the second identificaion information corresponding to the first identification information which is found by the matching means with the second identification information entered by the entering means, and a means for writing information representing allowance of issuance of the card on the card if the compared second identification information agrees with each other, the second system having a means for matching the second identification information to its corresponding first identification information, the method comprised of the steps of sending the first identification information and an inquiry as to whether a credit card can be issued or not, from the first system to the second system, transmitting second identification information corresponding to the first identification information which is found by the matching means of the second system to the first system when the second system determines that the credit card can be issued, entering the transmitted second identification information from the entering means into the first system, comparing, in the first system, the second identification information corresponding to the first identification information which is found by the matching means of the first system with the second identification information which is transmitted from the second system, and writing information indicating that the credit card can be issued on the credit card and issuing the credit card if the compared second identification information agrees with each other.

A plurality of cards with storage means which can be issued are stocked in the retail store which has the first system. Each card has each first identification information of the card recorded in the storage means. When asked by a customer to buy goods with credit, the retail store assigns a certain card to the customer, and makes a contact with the second system which has information of and controls over purchases of goods by the said customer with credit, then inquire the credibility of the said customer. The second system investigates the credibility information of the customer. If the buying of the goods with credit is allowed, the second system transmits second identification information derived from the first identification information to the first system. In response to the transmitted second identification information, the means for deriving second identification information in the first system derives information corresponding to the transmitted information, and the comparing means compares the derived information with the transmitted second identification information. If the compared second identification information agrees with each other, then the reading/writing means writes information indicating that the card can be issued on the card, allowing the card to be issued. If the compared identification information does not agree with each other, then information representing that the compared identification information does not agree with each other is indicated or displayed, and the issuance of the card is rejected.

The above and other objects, features, and advantages of the present invention will become apparent from the following description when taken in conjunction with the accompanying drawings which illustrate preferred embodiments of the present invention by way of example.

BRIEF DESCRIPTION OF THE DRAWINGS

FIG. 3 is a view of a customer file used in the credit card system according to the first embodiment;

DETAILED DESCRIPTION OF THE PREFERRED EMBODIMENTS

Figure 1:
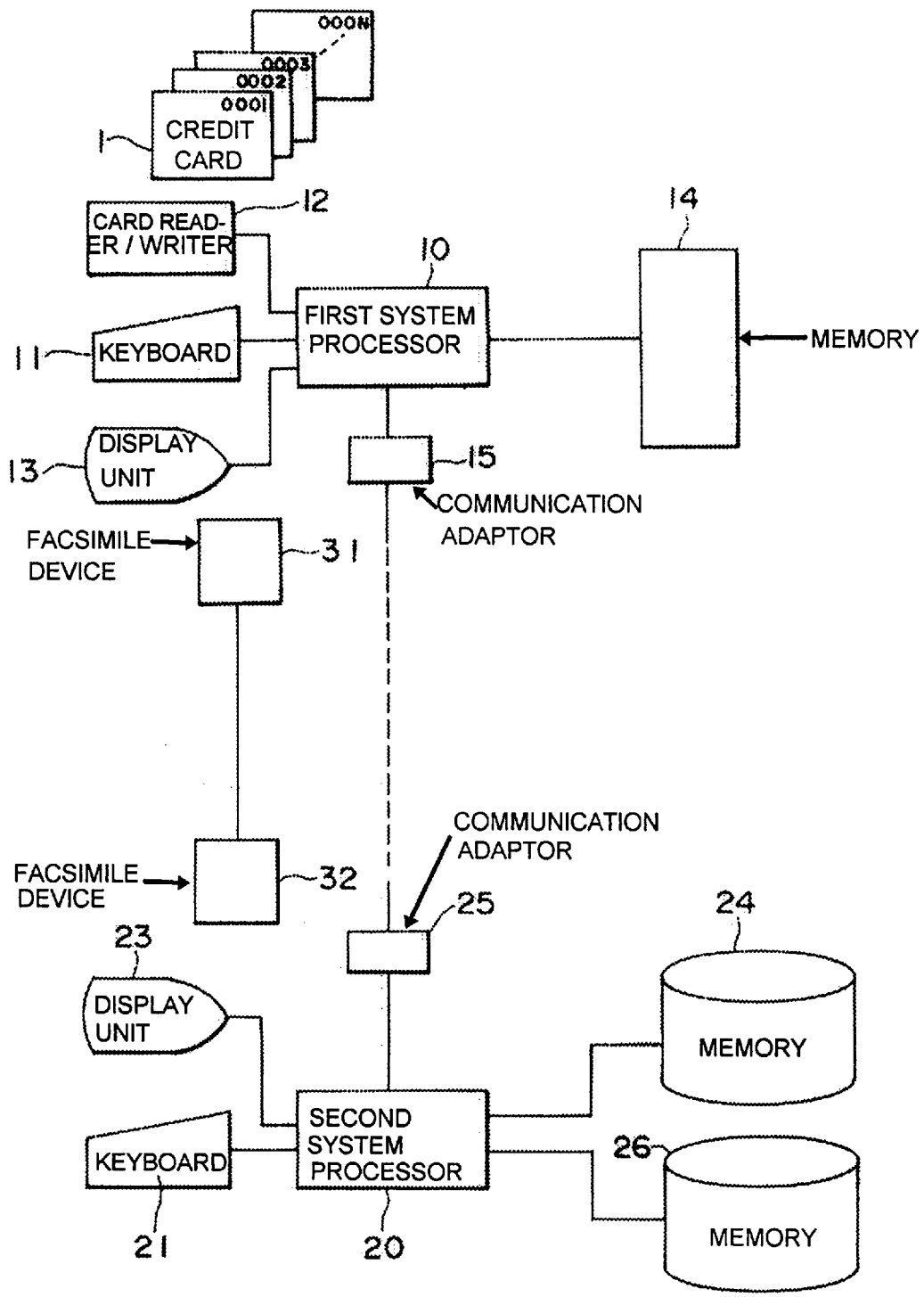
FIG. 1 is a block diagram of a credit card system according to a first embodiment of the present invention.
Figure 2:
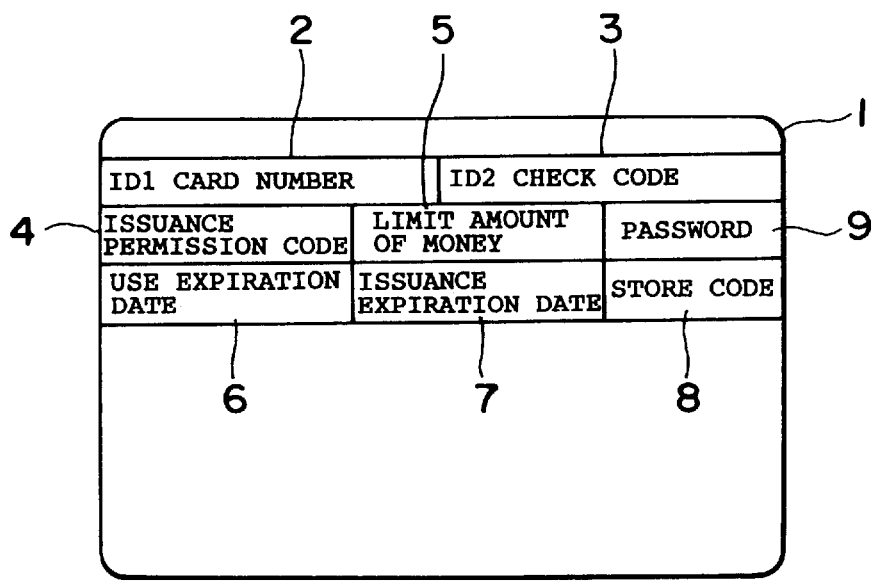
FIG. 2 is a view of a credit card used in the credit card system according to the first embodiment.

As shown in FIGS. 1 and 2, a credit card system according to a first embodiment of the present invention issues credit cards 1 each having a first identification information column 2 for recording first identification information, e.g., an ID1 card number, a second identification information column 3 for recording second identification information, e.g., an ID2 check code, an information column 4 for recording information indicative of the permission of a card issuance, a limit amount column 5 for recording a money limit up to which the user can pay with the credit card, a use expiration date column 6 for recording a date on which the use of the credit card expires, an issuance expiration date column 7 for recording a date on which the issuance of the credit card expires, a store code column 8 for recording information of a retail store in which the credit card can be used, and a password column 9 for recording a password.

The credit card system shown in FIG. 1 is composed of a first system installed in a retail store for selling goods with credit and a second system installed in a credit company for managing credit information. The credit card system includes a first system processor 10 associated with the first system, a keyboard 11 connected to the first system processor 10, a card reader/writer 12 connected to the first system processor 10, a display unit 13 connected to the first system processor 10, a memory 14 connected to the first system processor 10, a communication adapter 15 connected to the first system processor 10. The credit card system also includes a second system processor 20 associated with the second system, a keyboard 21 connected to the second system processor 20, a display unit 23 connected to the second system processor 20, a pair of memories 24, 26 connected to the second system processor 20, a communication adapter 25 connected to the second system processor 20. Furthermore, a facsimile device 31 is associated with the first system, and a facsimile device 32 associated with the second system.

The credit cards 1 to be issued by the credit card system are stocked in the retail store. Identification information, e.g., numbers from 0001 to 000N, for the respective credit cards 1 are registered in the first identification information columns 2 of the credit cards 1. The identification information registered in the first identification information column 2 is also printed or otherwise made visible on the credit card 1. Second identification information, which represents an ID2 check code in the form of a number, is registered in the second identification information column 3, but cannot visually be recognized on the credit card 1. The combination of the first identification information and the second identification information is recorded in advance as a matching table shown in FIG. 3 in a customer information file in the memories 24, 26 of the second system. In the illustrated credit card system, the credit limit the issuance expiration date, and the store code are recorded respectively in the columns 5, 7, 8 of each of the credit cards 1. No information may be recorded in advance in all or some of these columns of a credit card, and such missing information may be recorded as information indicative of allowance of the issuance of the credit card in these columns at the time the credit card is issued.

When a customer desires the purchase of goods with credit in a retail store, the person in charge in the retail store obtains information such as the name, sex, date of birth, etc. of the customer. The person in charge then assigns a credit card 1 with a certain identification number, e.g.; 0001, recorded thereon, to the customer and inquire, with the identification number, to the second system about the credibility of the customer. The inquiry may be made on-line through the communication adapters 15, 25 or off-line through the facsimile devices 31, 32 or a telephone. In response to the inquiry, the second system searches files stored in the memories 24, 26 for the credibility of the customer. If the customer has good credibility and the credit sale is allowable, then the second system searches the matching tables shown in FIG. 3, in the customer information files, for a second identification number (ID2) for use as a check code which corresponds to the identification number 0001 (IDI) given to the second system, and sends the second identification number, e.g., 4321, to the first system on-line through the communication adapters 15, 25 or the off-line through the facsimile devices 31, 32 or telephone.

Figure 4A:
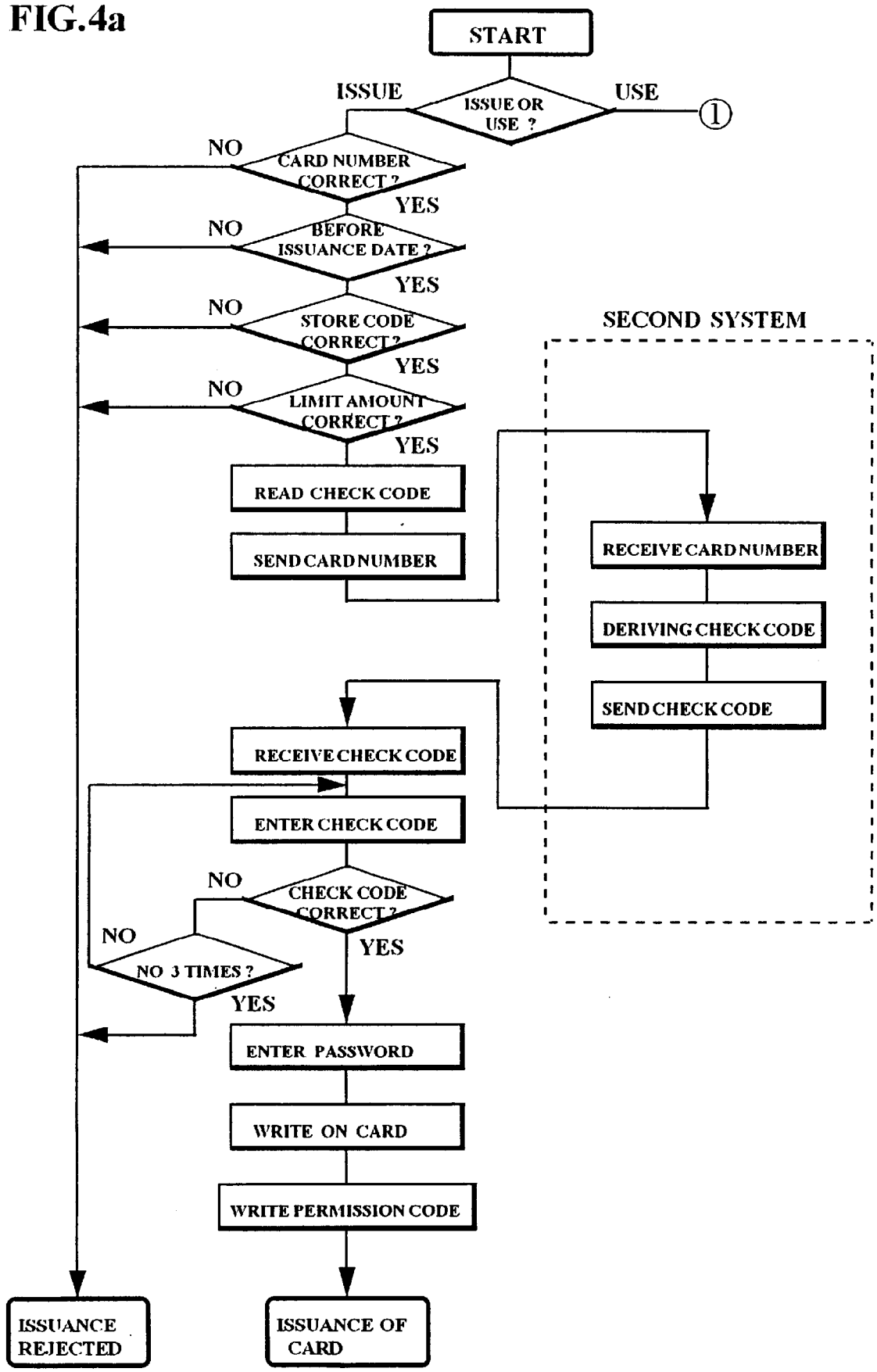
FIG. 4A is a flowchart of a processing sequence for issuance of the credit card system a according to the first embodiment.

When the first system is notified of the second identification number, as shown in FIG. 4A, the person in charge in the retail store selects the mode for new card issuance, and inserts the credit card 1 to be issued into the card reader/writer 12. The first system processor 10 checks the expiration dates, the credit money, and the store code of the credit card 1 and reads the first identification number 0001 of the credit card 1 from the ID1 card number column and the second identification number from the ID2 check code column, and displays a prompt on the display unit 13 to enter the second identification number of the customer. When the person in charge enters the second identification number 4321 of the customer through the keyboard 11, the first system processor 10 compares the entered second identification number and the second identification number it has read, and if they agree with each other, the processor 10 requests the password of the customer to be entered. When the password is entered, the first system processor 10 records the password in the password column 9 of the credit card 1, records the use expiration date in the use expiration date column 6 of the credit card 1, records a numerical value as information indicative of allowance of the issuance of the credit card 1 in column 4, and allows the credit card 1 to be issued. If the compared second identification numbers do not agree with each other, then the first system processor 10 judges that the credit card inserted is not the credit card which the first system intends to issue, and displays information indicative of the rejection of the issuance of the card on the display unit 13. Credit cards are prevented from being issued illegally because the second identification number recorded on the card which the customer and the card issuer are unaware of and the second identification number derived and notified by the second system are compared and checked for agreement, and the credit card is issued only if these second identification numbers are correct. While the person in charge, i.e., the operator of the first system, manually enters the second identification number in this embodiment, it can automatically be entered by the first system if the first and second systems are connected on-line to each other.

In this embodiment, the credit card is issued with the numerical value indicative of allowance of the issuance of the credit card being recorded on the credit card. The information indicative of allowance of the issuance of the credit card may be a simple numerical value, or the issuance of the credit card may be allowed by recording the limit amount of money, the identification number of the customer, the check code, and other information on the credit card.

Figure 4B:
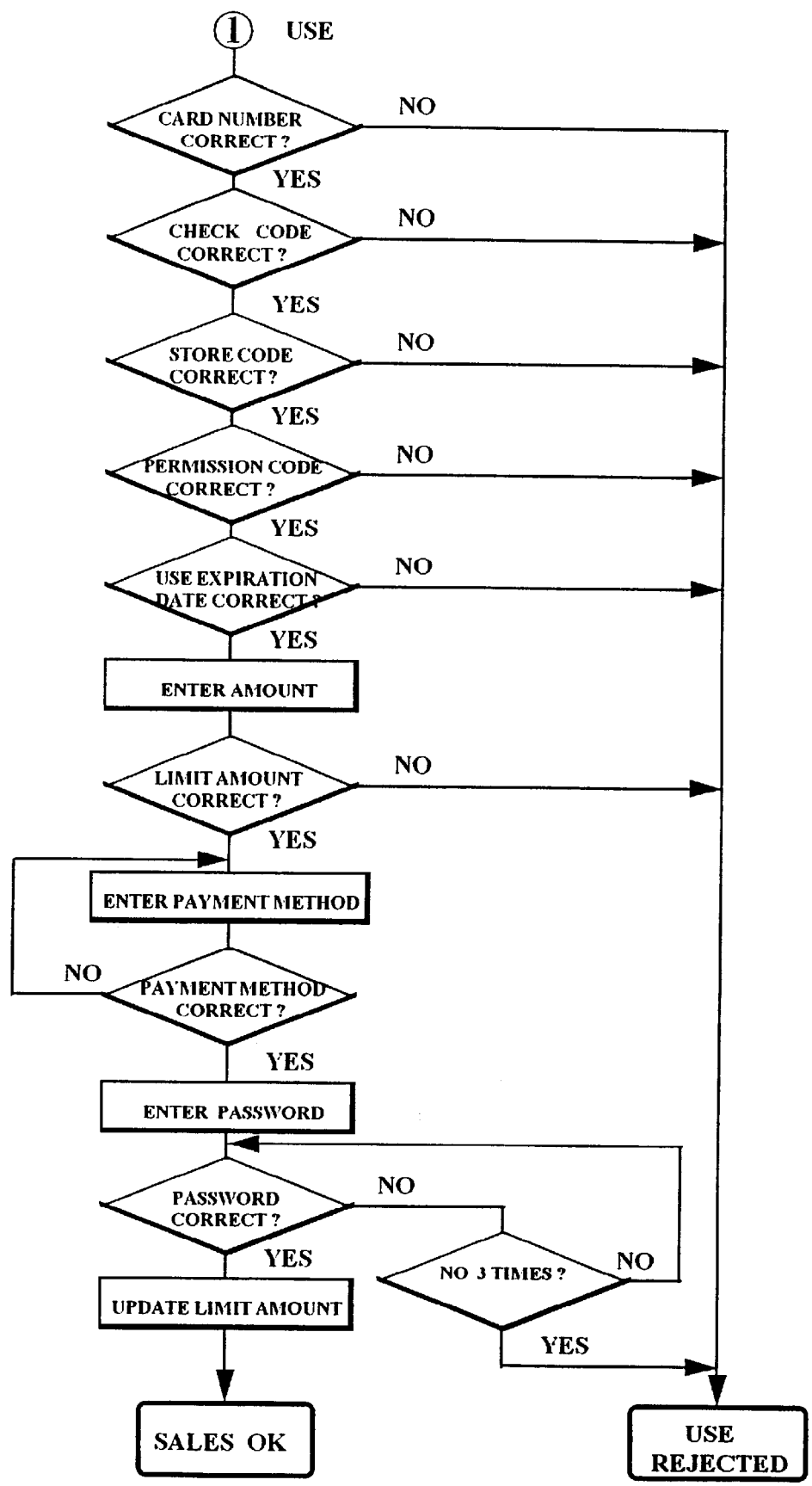
FIG. 4B is a flowchart of a processing sequence for using the credit card system of FIG. 1.

When the user is to purchase goods with the credit card 1, the user asks the retail store to buy goods with the credit card 1. As shown in FIG. 4B, the person in charge in the retail store selects the mode for use of the credit card, and inserts the credit card 1 into the card reader/writer 12. The first system processor 10 checks the identification number of the credit card, the use expiration date, and the store code, and also checks if there is information indicative of allowance of issuance of the credit card. If the checked information is missing or not properly recorded, then the first system processor 10 rejects the use of the credit card 1. If the checked information is perfect for use, then the first system processor 10 displays a prompt on the display unit 13 to enter the amount of money to be paid. When the person in charge enters the amount of money to be paid and a payment method, the first system processor 10 ascertains whether the amount of money to be paid is less than the limit amount of money or not. If not, then the first system processor 10 displays information indicative of rejection of sales with credit on the display unit 13. If the amount of money to be paid is less than the limit amount of money, then the first system processor 10 requests the password to be entered. If the entered password agrees with the password on the credit card 1, then the first system processor 10 allows sales with credit, subtracts the amount of money to be paid from the limit amount of money, updates the limit amount recorded in the limit amount column 5, and returns the credit card 1.

The issued credit card 1 is a credit card with the amount of money (e.g., 300,000 yen) recorded as a limit amount in the limit amount column 5. Insofar as the amount of money to be paid is less than the limit amount money then recorded in the limit amount column 5 when used, the customer can use the credit card 1 repeatedly without the need of credit application procedure and credibility inquiry each time the customer buys goods with the credit card 1. If the limit amount of money is set to a relatively small amount of money, then the credibility investigation carried out by the second system is simplified, allowing the second system to answer to a credibility inquiry from the first system in a very short period of time. Accordingly, a credit card can be issued immediately upon request.

Even though credit cards are issued by the retail store immediately upon request, the credit cards are prevented from being illegally issued with high probability because they are checked based on the information which the customer and the card issuer are unaware of. When credit cards are used, the credit card system is protected from use of forged credit cards as the credit cards are checked by the plural items of identification information.

Figure 5:
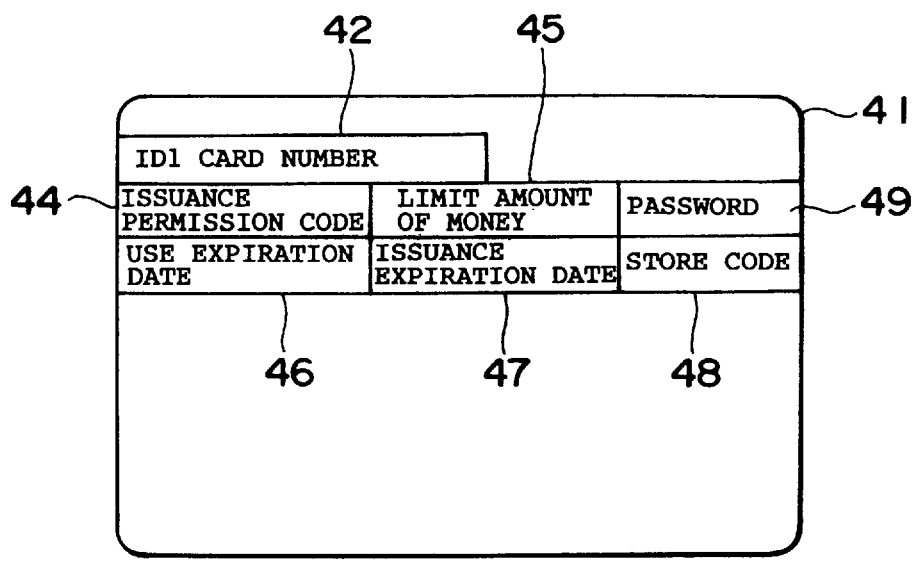
FIG. 5 is a view of a credit card used in a credit card system according to a second embodiment of the present invention.

FIGS. 5 shows a credit card system according to the second embodiment of the present invention. FIG. 5 illustrates a credit card 41 for use in the credit card system according to the second embodiment. The credit card 41 has a first identification information column 42 for recording first identification information, e.g., an ID1 card number, an information column 44 for recording information indicative of the permission of a card issuance, a limit amount column 45 for recording a limit amount of money up to which the user can pay with the credit card, a use expiration date column 46 for recording a date on which the use of the credit card expires, an issuance expiration date column 47 for recording a date on which the issuance of the credit card expires, a store code column 48 for recording information of a retail store in which the credit card can be used, and a password column 49 for recording a password.

In the second embodiment, any number treated as the second identification information is not registered on the credit card before card issuance as in the first embodiment. The credit card system according to the second embodiment has first and second systems each having a means for deriving a numerical value treated as the second identification information upon entry of a numerical value treated as the first identification information. Such a numerical value regarded as the second identification information may be derived by effecting certain calculations on the numerical value representing first identification information or extracting certain figures from the numerical value representing first identification information, or by any of various other methods which can derive a certain numerical value that has a logical relationship to the first identification information, from the first identification information.

In this credit card system according to the second embodiment, when a customer desires the purchase of goods with credit in a retail store, the person in charge in the retail store obtains information such as the name, sex, date of birth, etc. of the customer, and assigns a credit card 41 with a certain identification number, e.g., 0001, recorded thereon, to the customer, then inquires, with the identification number, the second system about the credibility of the customer. The inquiry may be made on-line or off-line through facsimile or telephone. In response to the inquiry, the second system checks the credibility of the customer. If the customer has good credibility and the credit sale is allowable, then the second system effects certain calculations on the received identification number 0001 of the credit card, and sends the derived numerical value, e.g., of 4321, as a second identification number for use as a check code, to the first system on-line or off-line through facsimile or telephone.

Figure 6A:
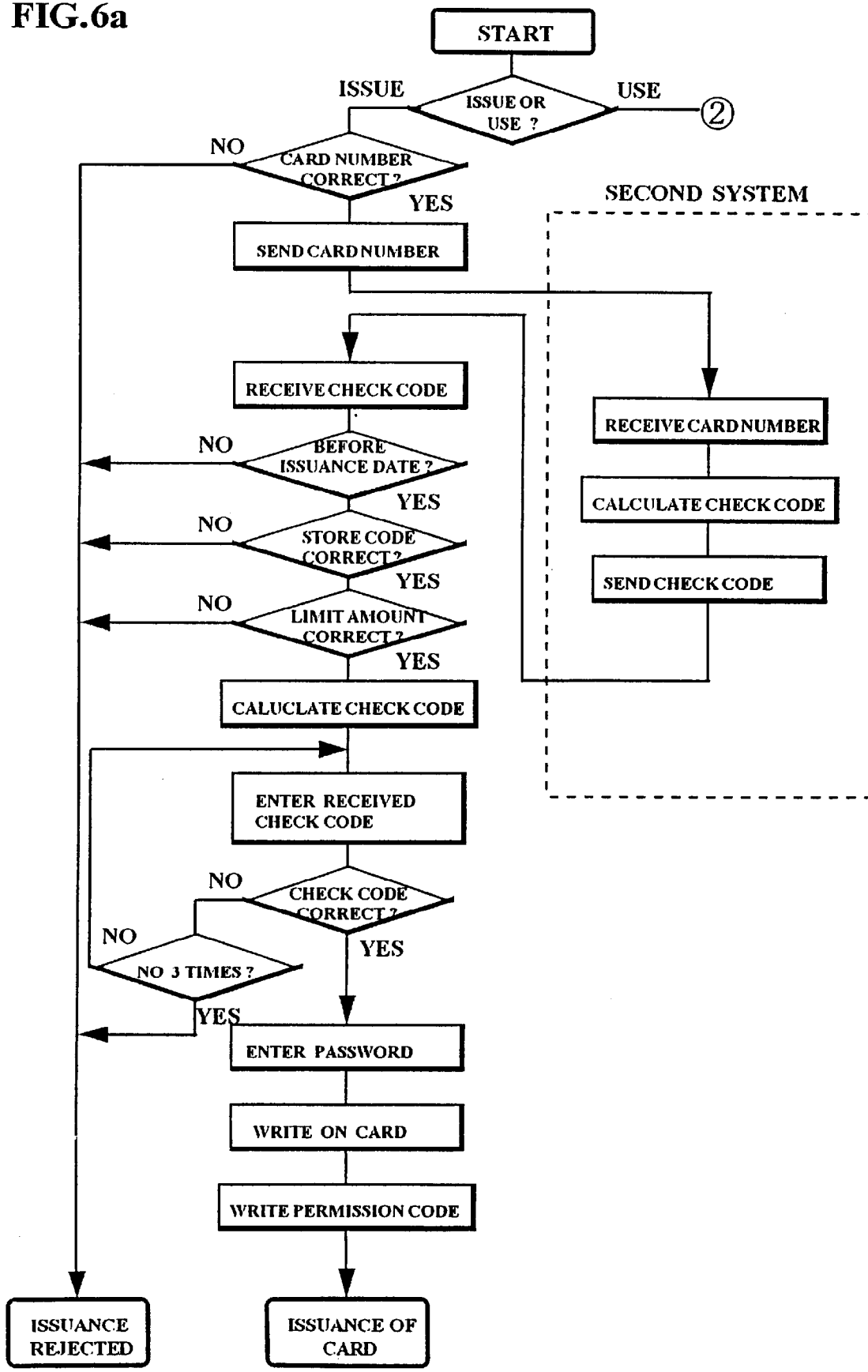
FIG. 6 is a flowchart of a processing sequence for issuance of the credit card system according to the second embodiment.
FIG. 6B is a flowchart of a processing sequence for using the credit card system of FIG. 5.
Figure 6B:
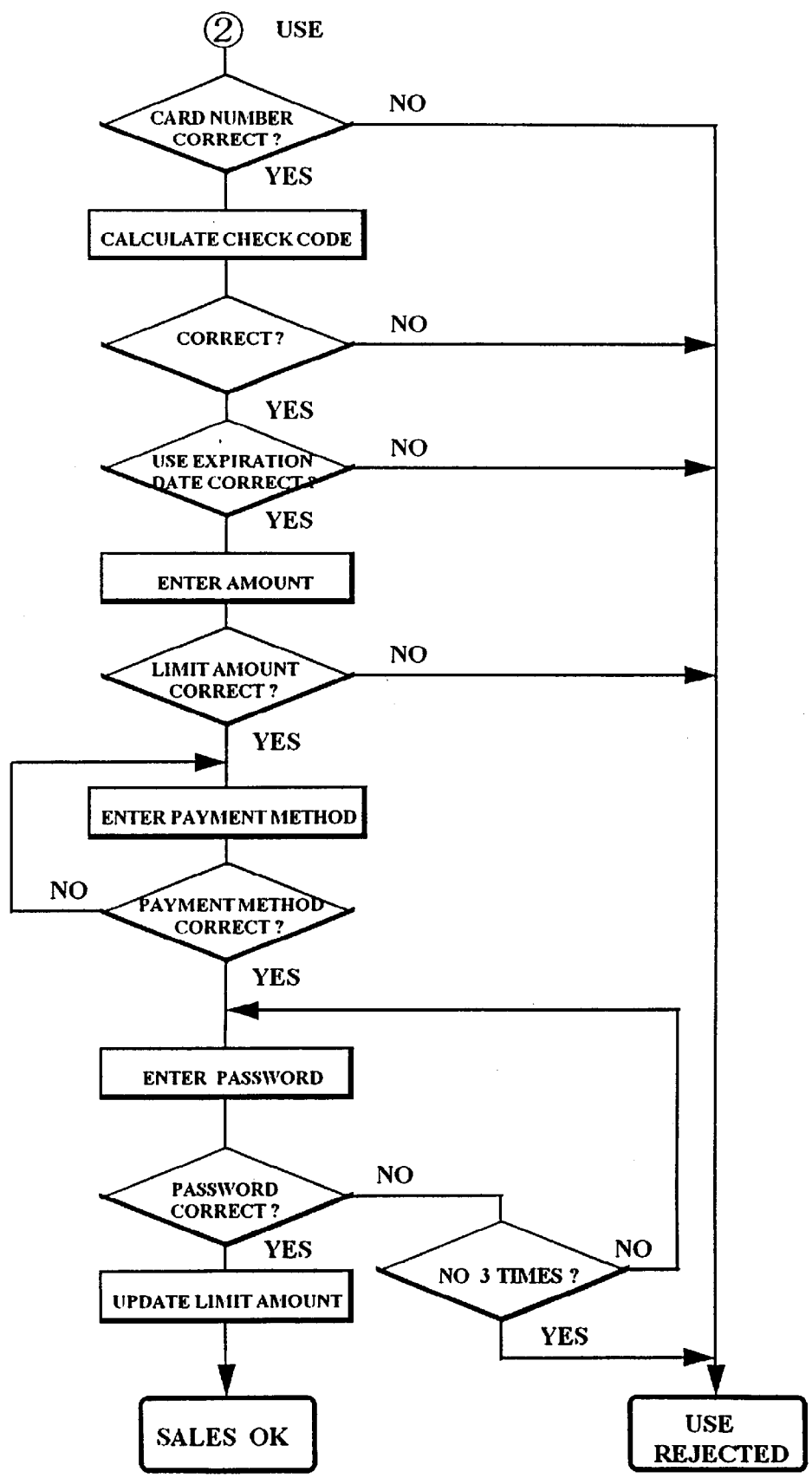

In the first system, as shown in FIG. 6A, when the first system is notified of the sent numerical value, the person in charge in the retail store selects the mode for new card issuance, and inserts the credit card 41 to be issued into the card reader/writer 12. The first system processor 10 checks the expiration dates, the limit amount of money, and the store code of the credit card 41, and reads the identification number 0001 of the credit card 41, derives a second identification number from the identification number through calculations, then displays a prompt on the display unit 13 to enter the second identification number. When the person in charge enters the received identification number 4321 of the customer through the keyboard 11, the first system processor 10 compares the entered identification number and the calculated second identification number, and if the compared identification numbers agree with each other, the processer 10 requests the password of the customer to be entered. When the password is entered, the first system processor 10 records the password in the password column 49 on the credit card 41, the use expiration date in the use expiration column 46 of the credit card 41, and a numerical value as information indicative of allowance of the issuance of the credit card 41 in the information column 44, and allows the credit card 41 to be issued. If the compared identification numbers do not agree with each other, then the first system processor 10 judges that the credit card inserted is not the credit card which the first system intends to issue, and displays information indicative of the rejection of the issuance of the card on the display unit 13. Credit cards are prevented from being issued illegally because the second identification number derived by the first system from the first identification number and the second identification number derived by the second system in a manner which the customer and the card issuer are unaware of are checked, and the credit card is issued only if these identification numbers are correct. While the person in charge, i.e., the operator of the first system, manually enters the second identification number also in the second embodiment, they can automatically be entered by the first system if the first and second systems are connected on-line to each other.

A credit card system according to the third embodiment of the present invention issues or uses the credit card 41 shown in FIG. 5 according to the flow-chart shown in FIG. 4A. According to the third embodiment, a number treated as the second identification information is not registered on a credit card before card issuance, but is registered in a matching table shown in FIG. 3 in both the first system and the second system.

According to the third embodiment, when a customer desires the issuance of a credit card in a retail store, the person in charge in the retail store obtains information such as the name, sex, date of birth, etc. of the customer, and assigns a credit card 41 with a certain identification number, e.g., 0001, recorded thereon, to the customer, then inquires, with the identification number, the second system about the credibility of the customer. The inquiry may be made on-line or off-line through facsimile or telephone. In response to the inquiry, the second system checks the credibility of the customer. If the customer has good credibility and the credit sale is allowable, then the second system searches the matching table shown in FIG. 3 for the second identification number for use as a check code which corresponds to the identification number 0001 of the card, and sends the corresponding numerical value, e.g., of 4321, to the first system on-line or off-line through facsimile or telephone.

When the first system is notified of the second identification number, as shown in FIG. 4A, the person in charge in the retail store selects the mode for new card issuance, and inserts the credit card 41 to be issued into the card reader/writer 12. The first system processor 10 checks the expiration dates, the credit limit and the store code of the credit card 41, and reads the first identification number 0001 of the credit card 41, searches the matching table shown in FIG. 3 which has been registered in the first system for the second identification number 4321 corresponding to the first identification number 0001, and displays a prompt on the display unit 13 to enter the second identification number of the customer. When the person in charge enters the received second identification number 4321 of the customer through the keyboard 11, the first system processor 10 compares the entered second identification number and the second identification number it has read from the memory 14, and if they agree with each other, the processor 10 requests the password of the customer to be entered. When the password is entered, the first system processor 10 records the password in the password column 49 of the credit card 41, records the use expiration date in the use expiration date column 46 of the credit card 41, records a numerical value as information indicative of allowance of the issuance of the credit card 41 in the column 44, and allows the credit card 41 to be issued.

If the compared second identification numbers do not agree with each other, then the first system processor 10 judges that the credit card inserted is not the credit card which the first system intends to issue, and displays information indicative of the rejection of the issuance of the card on the display unit 13. Credit cards are prevented from being issued illegally, because the second identification number stored in the memory which the customer and the card issuer are unaware of and the second identification number derived and notified by the second system are checked for agreement, and the credit card is issued only if these second identification numbers are correct. While the person in charge, i.e., the operator of the first system, manually enters the second identification number also in the third embodiment, it can automatically be entered by the first system if the first and second systems are connected on-line to each other.

According to the present invention, the credit card system, only with relatively small scaled system in a retail store, allows the retail store to issue a credit card immediately upon request and also to sell goods to a customer with credit. The retail store can sell goods with credit in the same manner as the conventional single-purchase sales credit, and the credit card can be used repeatedly insofar as the accumulated paid amount is lower than a certain limit amount recorded on the credit card as with the conventional credit cards. Therefore, the customer is not required to apply for payment with credit upon each purchase. Since this credit card system has a sophisticated checking capability, it is effective to prevent credit cards from being issued or used illegally with high probability.

Although certain preferred embodiments of the present invention has been shown and described in detail, it should be understood that various changes and modifications may be made therein without departing from the scope of the appended claims.

What is claimed is:

1. A credit card issuing system comprising:

a credit card;

means for storing written first identification information on the card;

device means for writing information on and reading information from the card;

means for sending the first identification information so as to receive second identification information;

means for entering second identification information, which is not notified unless the sending means sends the first identification information;

means for deriving second identification information from information written on said card;

means for comparing the second identification information entered by the said entering means with the second identification information derived by said deriving means; and means for writing information on the card to indicate allowance of issuance of the card, if the comparison of the second identification information agrees with each other.

2. The credit system according to claim 1, wherein the second identification information is logically derived from the first identification information.

3. The credit card system according to claim 1, wherein the second identification information corresponds to the first identification information.

4. A method of issuing a credit card with a first system for issuing and managing a credit card, a second system for managing credit information of a customer, and a card having a means for storing written first identification information, the first system having a means for generating a second identification information from the first identification information, a means for reading information from and writing information on the card, a means for entering the second identification information, a means for comparing the second identification information generated by the generating means with the second identification information entered by the entering means, and a means for writing information on the cards representing allowance of issuance of the card if the compared second identification information agrees with each other, said method comprising the steps of:

sending from the first system to the second system, the first identification information and an inquiry as to whether a credit card can be issued or not;

transmitting the second identification information generated from the first identification information to the first system when the second system determines the credit card can be issued;

entering the transmitted second identification information from the entering means into the first system;

generating, in the first system, the second identification information from the first identification information;

comparing, in the first system, the generated second identification information with the second identification information transmitted from the second system; and writing information indicating the credit card can be issued on the credit card and issuing the credit card if the compared second identification information agrees with each other.

5. A method of issuing a credit card with a first system for issuing and managing a credit card, a second system for managing credit information of a customer, and a card having a means for storing written first identification information and second identification information, the first system having a means for reading information from the writing information on the card, a means for entering the second identification information, a means for comparing the second identification information written on the card and the second information entered by the entering means, and a means for writing information on the card representing allowance of issuance of the card if the compared second identification information agrees with each other, the second system having a means for matching the second identification information to its corresponding first identification information, said method comprising the steps of:

sending from the first system to the second system, the first identification information and an inquiry as to whether a credit card can be issued or not;

transmitting the second identification information corresponding to the first identification information and derived from the matching means to the first system when the second system determines that the credit card can be issued;

entering the transmitted second identification information from the entering means into said first system;

comparing, in the first system, the second identification information written on the card with the second identification information transmitted from the second system; and writing information indicating the credit card can be issued on the credit card and issuing the credit card if the compared second identification information agree with each other.

6. A method of issuing a credit card with a first system for issuing and managing a credit card, a second system for managing credit information of a customer, and a card having a means for storing written first identification information, the first system having a means for matching second identification information to its corresponding first identification information, a means for reading information from and writing information on the card, a means for entering the second identification information, a means for comparing the second identification information corresponding to the first identification information found by the matching means with the second identification information entered by the entering means, and a means for writing information on the card representing allowance of issuance of the card if the compared second identification information agree with each other, the second system having a means for matching the second identification information to its corresponding first identification information, said method comprising the steps of:

sending from the first system to the second system, the first identification information and an inquiry as to whether a credit card can be issued or not;

transmitting the second identification information corresponding to the first identification information that is derived from the matching means of the second system to the first system when the second system determines the credit card can be issued;

entering the transmitted second identification information from the entering means into the first system;

comparing, in the first system, the second identification information corresponding to the first identification information that is derived from the matching means of the first system with the second identification information transmitted from the second system; and writing information indicating that the credit card can be issued on the credit card and issuing the credit card if the compared second identification information agrees with each other.

7. A credit card system according to claim 1, wherein the card has a limit amount column for recording a credit limit up to which the user of the credit card can pay with the credit card, further comprises:

means for updating the credit limit recorded in the limit amount column with an amount of money available to the user; and means for comparing the credit limit recorded in the limit amount column with the amount of money to be paid by the user, and indicating or displaying the result of comparison.

8. The credit card system according to claim 1, wherein the card has an issuance expiration date for recording a date on which the issuance of the credit card expires, further comprises means for comparing the issuance expiration date with a date on which the credit card actually issued, and indicating or displaying the result of comparison.

9. The credit card system according to claim 1, wherein the card has a use expiration date for recording a date on which the use of the credit card expires, further comprises means for comparing the use expiration date with a date on which the credit card is actually used, and indicating or displaying the result of comparison.

10. A system for managing a credit card issuing system comprising:

means for receiving first identification information sent by the credit card issuing system;

means for deriving second identification information from the first identification information received;

means for sending the second identification information derived, back to the credit card issuing system that sent the first identification information.

11. The credit card issuing system of claim 1 further comprising more than one credit card issuing system.

12. The credit card issuing system of claim 10 further comprising at least one system for managing the credit card issuing systems.

* * * * *